(12) United States Patent
Frigeri et al.

(10) Patent No.: US 8,931,397 B2
(45) Date of Patent: Jan. 13, 2015

(54) SUPPORT WITH A DOUBLE RESTING SURFACE FOR CUPS AND OTHER CONTAINERS IN MACHINES FOR THE PRODUCTION OF BEVERAGES

(75) Inventors: Patrizio Frigeri, Uster (CH); Marco Marchi, Bologna (IT)

(73) Assignee: Koninklijke Philips N.V., Eindhoven (NL)

( * ) Notice: Subject to any disclaimer, the term of this patent is extended or adjusted under 35 U.S.C. 154(b) by 1135 days.

(21) Appl. No.: 12/670,879

(22) PCT Filed: Jul. 31, 2008

(86) PCT No.: PCT/IT2008/000524
§ 371 (c)(1),
(2), (4) Date: May 27, 2010

(87) PCT Pub. No.: WO2009/016681
PCT Pub. Date: Feb. 5, 2009

(65) Prior Publication Data
US 2010/0236414 A1    Sep. 23, 2010

(30) Foreign Application Priority Data

Aug. 2, 2007 (IT) ................................ FI2007A0184

(51) Int. Cl.
*A47J 31/00* (2006.01)
*A47J 31/44* (2006.01)

(52) U.S. Cl.
CPC .......... *A47J 31/4482* (2013.01); *A47J 31/4403* (2013.01)

USPC .......................................................... 99/284

(58) Field of Classification Search
CPC ...... B67D 1/16; A47J 31/4403; A47J 31/4482
USPC .............. 99/284, 306, 307; 211/207, 208, 81;
248/125.1, 132, 145, 149, 150, 311.2;
220/244, 252, 810, 811, 820; 222/108
See application file for complete search history.

(56) References Cited

U.S. PATENT DOCUMENTS

| 473,399 | A | * | 4/1892 | Lee ............................. 220/254.2 |
| 4,009,805 | A | | 3/1977 | Klygis et al. |
| 5,441,163 | A | * | 8/1995 | Carrasco .................... 220/23.86 |

(Continued)

FOREIGN PATENT DOCUMENTS

| CN | 2768619 Y | 4/2006 |
| CN | 2887208 Y | 4/2007 |
| DE | 7915161 | 8/1979 |
| DE | 20200601749 U1 | 2/2007 |
| EP | 1731065 A1 | 12/2006 |

(Continued)

*Primary Examiner* — Reginald L Alexander

(57) ABSTRACT

A support for a container for receiving beverages from a spout of a machine for the production of beverages, where the support includes a first resting surface and a second surface with is hingedly attached to the first resting surface for positioning the two surfaces at different heights. In particular, the two resting surfaces are positioned on top of one another in a first position to accommodate a first cup between the second resting surface and the spout. Further, the two resting surfaces are positioned away from one another in a second position to accommodate a second cup between the first resting surface and the spout, where the second cup is taller than the first cup.

20 Claims, 2 Drawing Sheets

(56) References Cited

U.S. PATENT DOCUMENTS

| | | |
|---|---|---|
| 6,382,410 B1 * | 5/2002 | Magid et al. .................. 206/38.1 |
| 6,766,729 B2 * | 7/2004 | Rolland ........................... 99/284 |
| 7,478,584 B2 * | 1/2009 | Turi ................................. 99/284 |
| 8,091,469 B2 * | 1/2012 | Cahen et al. ..................... 99/279 |
| 2009/0308493 A1 | 12/2009 | Buchstab et al. |

FOREIGN PATENT DOCUMENTS

| | | |
|---|---|---|
| JP | 52120085 A | 10/1997 |
| WO | 0172190 A1 | 10/2001 |
| WO | 2008123003 A2 | 10/2008 |

* cited by examiner

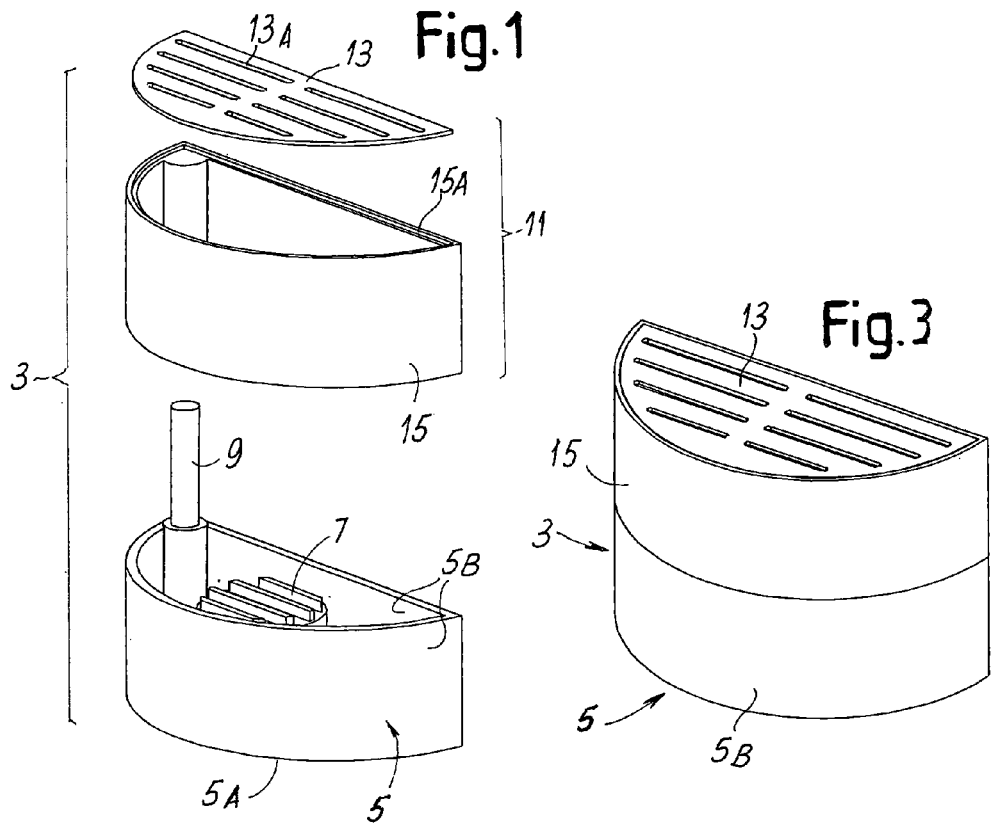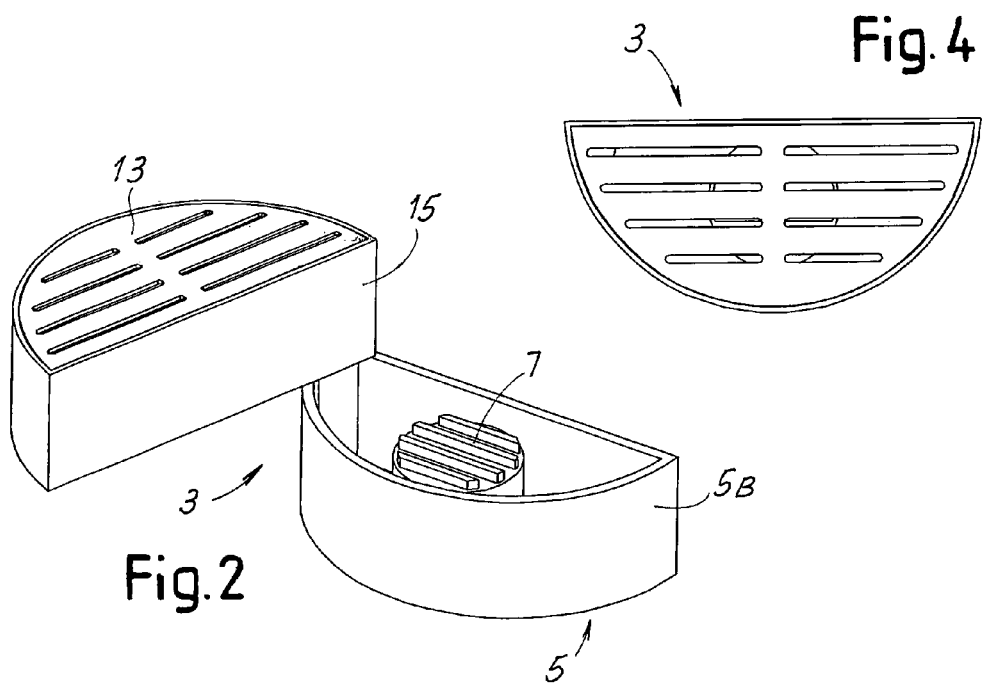

SUPPORT WITH A DOUBLE RESTING SURFACE FOR CUPS AND OTHER CONTAINERS IN MACHINES FOR THE PRODUCTION OF BEVERAGES

TECHNICAL FIELD

The present invention relates to a resting support for large or small cups in machines for the production of beverages, for example and in particular (but not exclusively), for the production of coffee.

STATE OF THE ART

In what follows specific reference will be made to the field of machines for the production of coffee, but it is to be understood that the invention can be advantageously applied also in other types of machines for the production or dispensing of beverages whenever there arise problems similar to the ones set forth in what follows.

Coffee machines have an infusion assembly, inserted within which is a dose of coffee, obtained by on-the-spot grinding of coffee beans, or else by loading of ground coffee, or else again a dose contained in a single-dose pack such as a cartridge, a capsule, etc. The dispensing assembly is connected on one side to a boiler and a pump for supply of hot water under pressure and on the other to one or more spouts for dispensing the coffee, set underneath which is a container, or a pair of containers, such as large or small cups, glasses or the like, for receiving the coffee dispensed therefrom.

In order to enable resting of the cup, these machines have a support set underneath the dispensing spout or spouts. Usually, the height of the dispensing spout or pair of dispensing spouts is adjustable so as to modify the distance between the dispensing spouts and the cup set on the support. This proves useful since with one and the same machine it is possible to produce different types of coffee, for example, espresso coffee or filter coffee, the so-called "fresh brew" coffee, or regular coffee. In the first case, to collect the coffee, coffee cups of small size are used, whereas in the second case taller cups are used, which require a larger space between the support and the dispensing spout.

The support for the cups usually comprises a resting grill, which is set in a substantially horizontal position and is in general constituted by a plane element with one or more holes, slits, or apertures of various shape for discharging liquids into an underlying collection tray. By the term "grill" is hence understood; in this context, both a gridlike structure and, more in general, a wall with one or more through holes, slits, or openings of various shape for discharging liquids downwards, underneath said grill.

SUMMARY OF THE INVENTION

According to one aspect, a purpose of the invention is to provide a support for large or small cups in coffee machines or other machines for the production of beverages.

According to another aspect, a purpose of the present invention is to provide a machine for the production of beverages, in particular but not exclusively a coffee machine, which will prove more economically advantageous as regards providing adaptability of the height of the resting surface for the cup for receiving the beverage with respect to the dispensing spout or spouts.

Basically, in one embodiment, the invention envisages a support for a container for receiving beverages in a machine for the production of beverages, said support being characterized in that it comprises a first resting surface and a second resting surface, which can be set on top of one another at different heights.

In principle, the two resting surfaces could be provided by separate elements, which can be set on top of one another according to the need. However, in a preferred embodiment of the invention, the first and second resting surfaces are constrained to one another so that they oscillate with respect to one another. The oscillation can be about a horizontal axis, i.e., parallel to the resting surfaces, but preferably about a vertical axis, i.e., orthogonal to the resting surfaces, in so far as in this way a more practical and compact support is obtained, in addition to a more convenient and less costly production.

In some embodiments, the support comprises a tray for collecting liquids, set above the bottom of which so that they can be set on top of one another are said first and said second resting surfaces. Preferably, the first resting surface is fixed with respect to the tray; for example, it is made in a single piece therewith of molded plastic material. In a modified embodiment, the first resting surface is set in a fixed position within said tray, but is made separately from the tray, for example, coupled by being slotted therein, or else simply set resting in a purposely provided seat.

In some embodiments, the first resting surface has a grill structure for discharging any possible residual liquids into the tray. Not to be ruled out is the possibility of providing the first resting surface as a continuous surface.

In some embodiments, the second resting surface is hinged to said tray. Also said second resting surface has a grill structure, in this case with through openings, for discharging any possible residual liquids into the underlying tray.

In some embodiments, the second resting surface is provided with an edge facing the underlying tray.

Preferably, the second resting surface comprises a removable grill and an element for retention of said removable grill, said retention element being constrained to said tray and rotating with respect thereto about a hinge axis.

According to a different aspect, the invention concerns a machine for the production of beverages, in particular a coffee machine, comprising at least one spout for dispensing of the beverage, a support for a container for receiving the beverage, such as a cup or the like, and a tray positioned underneath said at least one dispensing spout; wherein said support is made as described above and comprises a first resting surface and a second resting surface, which can be set on top of one another at different heights.

BRIEF DESCRIPTION OF THE DRAWINGS

The invention will be better understood from the description and the annexed plates of drawings, which show a practical non-limiting embodiment of the invention. More in particular, in the drawings:

FIG. 1 is an exploded view of a support according to the invention;

FIG. 2 is a perspective view of the support of FIG. 1 in a position mounted and open for use of the bottom resting surface;

FIG. 3 is a perspective view similar to that of FIG. 2, but with the resting surfaces set on top of one another for use of the top surface;

FIG. 4 is the plan view of the support in the configuration of FIG. 3; and

DETAILED DESCRIPTION OF AN EMBODIMENT OF THE INVENTION

Figure 5:
FIG. 5 is a schematic representation of a coffee machine provided with a support of the type illustrated in FIGS. 1 to 4.

FIG. 5 shows a coffee machine, designated as a whole by 1, provided with a support 3 for large or small cups made according to the invention, which is set underneath a dispensing spout 1A. The structure of the support 3 is shown in greater detail in FIGS. 1 to 4.

In one embodiment, the support 3 comprises a bottom tray 5, made, for example, of molded plastic material, with a bottom 5A and a side wall 5B. In the example illustrated, the tray 5A has a semicircular shape, but it must be understood that the shape of the tray of the support as a whole can vary also according to the design of the machine in which the support itself is inserted.

In the central area, the bottom 5A of the tray 5 develops upwards and provides, forming a single piece with the tray itself, a first bottom resting surface 7 constituted by a grill structure. More in particular, the bottom surface 7 is constituted by a series of longitudinal elements set alongside one another, which define a geometrical resting surface for a container, such as, for example and in particular, a cup for filter coffee. Defined between the aligned longitudinal elements are drainage channels for the possible liquid that comes out of the dispensing spout 1A of the machine 1 in the absence of the receiving container placed on the surface 7.

Fixed with respect to the bottom tray 5 is a pin 9, for example a metal pin embedded in the molded plastic material forming the tray 5, or else a pin made of plastic material of a single piece with the tray 5. The pin 9 extends according to an axis approximately orthogonal to the bottom resting surface 7 and to the bottom 5A of the tray 5. Said pin 9 forms a hinge for a top part of the support 3, designated as a whole by 11. The portion 11 comprises a top grill 13, made, for example, of plastic material, metal or the like, with through slits or openings 13A that enable discharge of the liquid into the underlying tray 5. The grill 13 defines a top resting surface for the cups or other containers for receiving the beverage dispensed by the machine 1.

The grill 13 is housed in a seat 15A defined and delimited by the top edge of a retention element 15, which withholds the grill 13 and has a hole, inserted within which from beneath is the pin 9 so that the portion 11 formed by the grill 13 and by the element 15 can rotate about the axis of the pin 9 with respect to the underlying tray 5, which in a mounted configuration remains fixed with respect to the machine 1, even though it can be removed therefrom so as to be washed or emptied.

The element 15 basically defines an edge that surrounds the grill 13 and develops downwards from the surface defined by the grill itself. Said edge has a semicircumferential development substantially corresponding to that of the side wall 5B of the underlying tray 5. In this way, when the portion 11 formed by the grill 13 and by the element 15 is set aligned with the underlying tray 5 and set on top thereof, there is defined (FIG. 3) a hemicylindrical space closed laterally by the wall 5B of the tray 5 and by the element 15 and at the top by the grill 13. When the support is in this position, illustrated by a solid line in FIG. 5, on the top-resting surface defined by the grill 13 there can be rested a cup of small size for receiving espresso coffee.

When it is desired to set underneath the dispensing spout 1A of the coffee machine 1 a cup of larger capacity, in particular, taller than the espresso-coffee cup, the support 3 takes the configuration of FIG. 2, represented with a dashed line also in FIG. 5. In this configuration, the top portion 11, with respect to which the top resting surface formed by the grill 13 is fixed, is set in a position rotated through approximately 90° about the axis of the pin 9 with respect to the underlying tray 5. The bottom-resting surface 7, which is located inside the tray 5, is thus made available and accessible. This resting surface is located at a substantially lower height than the top resting surface defined by the grill 13, and it is possible to rest thereon a cup of larger size, in particular a very tall cup, for receiving a filter coffee or fresh-brew coffee.

In this way, a support 3 is provided, which, with a simple maneuver, can assume two positions for enabling use alternatively of the bottom resting surface 7 or else of the top resting surface 13 according to the height of the container or cup that it is intended to be used for the coffee or other beverage each time desired by the user.

There is thus no longer the need to adjust the height of the dispensing spout or spouts 1A of the coffee machine 1 or else the height of the resting surface, and in this way the structure of the machine is substantially simplified.

It is understood that the drawings show just one example provided purely by way of practical illustration of the invention, which can vary in the forms and arrangements without thereby departing from the scope of the idea underlying the invention. The possible presence of reference numbers in the annexed claims has the purpose of facilitating reading of the claims with reference to the description and to the plates of drawings, and in no way limits the sphere of protection represented by the claims.

The invention claimed is:

1. A support for a container for receiving beverages from a spout in a machine for production of beverages, the support comprising:
   a first resting surface;
   a second resting surface which is hingedly attached to the first resting surface for positioning the first resting surface and the second resting surface at different heights, the second resting surface being on top of the first resting surface in a first position where the second resting surface covers the first resting surface for providing a first distance between the spout and the second resting surface to accommodate a first cup between the second resting surface and the spout; and
   a tray for collection of residual liquids received from said first and second resting surfaces,
   wherein the second resting surface is rotatable about an axis of a hinge away from the first resting surface to second position to expose the first resting surface for providing a second distance between the spout and the first resting surface to accommodate a second cup between the first resting surface and the spout, and wherein the second cup is taller than the first cup, and
   wherein the first resting surface includes drainage channels having walls separated by a floor which is raised above a bottom of the tray, the walls of the drainage channels being raised above the floor for drainage of the residual liquids from the floor through ends of the drainage channels into the bottom of the tray which is below the drainage channels.

2. The support according to of claim 1, wherein the axis is orthogonal to said first and second resting surfaces.

3. The support of claim 1, wherein said first resting surface is fixed with respect to said tray.

4. The support of claim 3, wherein said first resting surface is set in a fixed position within said tray.

5. The support of claim 3, wherein said first resting surface has a grill structure for discharging the residual liquids into said tray.

6. The support of claim 1, wherein said second resting surface has a grill structure with through openings for discharging the residual liquids into said tray.

7. The support of claim 1, wherein said second resting surface is provided with an edge facing said tray, when the second resting surface is set on top of said tray, said edge forming, with said tray and said second resting surface, a closed space.

8. The support of claim 1, wherein said second resting surface comprises a removable grill and an element for retention of said removable grill, the element for retention being constrained to said tray.

9. A machine for the production of beverages comprising:
   at least one spout for dispensing the beverage;
   a support for a container for receiving the beverage, wherein the container includes at least one of a cup and a tray positioned underneath said at least one spout;
   a first resting surface; and
   a second resting surface which is hingedly attached to the first resting surface for positioning the first resting surface and the second resting surface at different heights, the second resting surface being on top of the first resting surface in a first position where the second resting surface covers the first resting surface for providing a first distance between the at least one spout and the second resting surface to accommodate a first cup between the second resting surface and the at least one spout,
   wherein the second resting surface is rotatable about an axis of a hinge away from the first resting surface to second position to expose the first resting for providing a second distance between the at least one spout and the first resting surface to accommodate a second cup between the first resting surface and the at least one spout, and wherein the second cup is taller than the first cup, and
   wherein the first resting surface includes drainage channels having walls separated by a floor which is raised above a bottom of the tray, the walls of the drainage channels being raised above the floor for drainage of the residual liquids from the floor through ends of the drainage channels into the bottom of the tray which is below the drainage channels.

10. The machine of claim 9, wherein the axis is orthogonal to said first and second resting surfaces.

11. The machine of claim 9, wherein said first resting surface is fixed with respect to said tray.

12. The machine of claim 11, wherein said first resting surface is set in a fixed position within said tray.

13. The machine of claim 11, wherein said first resting surface has a grill structure for discharging residual the liquids into said tray.

14. The machine of claim 9, wherein said second resting surface has a grill structure with through openings for discharging the residual liquids into said tray.

15. The machine of claim 12, wherein said second resting surface is provided with an edge facing said tray, when the second resting surface is set on top of said tray, said edge forming, with said tray and said second resting surface, a closed space.

16. The machine of claim 9, wherein said second resting surface comprises a removable grill and an element for retention of said removable grill, the retention element being constrained to said tray.

17. The support for a container for receiving beverages from a spout in a machine for production of beverages, the support comprising:
   a first resting surface;
   a second resting surface which is hingedly attached to the first resting surface for positioning the first resting surface and the second resting surface at different heights, the second resting surface being on top of the first resting surface in a first position where the second resting surface covers the first resting surface for providing a first distance between the spout and the second resting surface to accommodate a first cup between the second resting surface and the spout; and
   a tray for collection of residual liquids received from said first and second resting surfaces,
   wherein the second resting surface is rotatable about an axis of a hinge away from the first resting surface to second position to expose the first resting surface for providing a second distance between the spout and the first resting surface to accommodate a second cup between the first resting surface and the spout, and wherein the second cup is taller than the first cup, and
   wherein the hinge extends from an interior portion of the tray where the residual liquids are collected.

18. The support of claim 17, wherein the hinge is received by an opening at an interior part of a retention element that supports the second resting surface.

19. A machine for the production of beverages comprising:
   at least one spout for dispensing the beverage;
   a support for a container for receiving the beverage, wherein the container includes at least one of a cup and a tray positioned, underneath said at least one spout;
   a first resting surface; and
   a second resting surface which is hingedly attached to the first resting surface for positioning the first resting surface and the second resting surface at different heights, the second resting surface being on top of the first resting surface in a first position where the second resting surface covers the first resting surface for providing a first distance between the at least one spout and the second resting surface to accommodate a first cup between the second resting surface and the at least one spout,
   wherein the second resting surface is rotatable about an axis of a hinge away from the first resting surface to second position to expose the first resting for providing a second distance between the at least one spout and the first resting surface to accommodate a second cup between the first resting surface and the at least one spout, and wherein the second cup is taller than the first cup, and
   wherein the hinge extends from an interior portion of the tray where the residual liquids are collected.

20. The machine of claim 19, wherein the hinge received by an opening at an interior part of a retention element that supports the second resting surface.

* * * * *